United States Patent [19]
Yamaura et al.

[11] Patent Number: 4,964,493
[45] Date of Patent: Oct. 23, 1990

[54] SHOCK ABSORBER WITH VARIABLE DAMPING CHARACTERISTICS DEPENDING UPON STROKE SPEED

[75] Inventors: Tamotsu Yamaura; Fumiyuki Yamaoka; Mitsuo Sasaki, all of Kanagawa, Japan

[73] Assignee: Atsugi Motor Parts Company, Limited, Kanagawa, Japan

[21] Appl. No.: 333,337

[22] Filed: Apr. 5, 1989

[30] Foreign Application Priority Data

Apr. 6, 1988 [JP] Japan .................. 63-46494[U]
Apr. 6, 1988 [JP] Japan .................. 63-46495[U]
Apr. 7, 1988 [JP] Japan .................. 63-46966[U]
Jan. 12, 1989 [JP] Japan .................. 1-2578[U]

[51] Int. Cl.$^5$ .......................................... F16F 9/348
[52] U.S. Cl. ........................... 188/322.15; 188/280
[58] Field of Search ............. 188/280, 320, 322.14, 188/322.15

[56] References Cited

U.S. PATENT DOCUMENTS

| | | | |
|---|---|---|---|
| 4,076,276 | 2/1978 | Wijnhoven et al. | 188/322.15 X |
| 4,352,417 | 10/1982 | Stinson | 188/322.15 |
| 4,460,074 | 7/1984 | Müller et al. | 188/322.15 X |
| 4,610,332 | 9/1986 | Mourray | 188/322.15 |

FOREIGN PATENT DOCUMENTS

| | | |
|---|---|---|
| 3590858 | 9/1958 | Australia . |
| 4668764 | 1/1966 | Australia . |
| 310966 | 9/1967 | Australia . |
| 2622777 | 1/1979 | Australia . |
| 3109122 | 9/1982 | Fed. Rep. of Germany . |
| 1545406 | 9/1968 | France . |
| 61-47134 | 3/1986 | Japan . |

Primary Examiner—Duane A. Reger
Attorney, Agent, or Firm—Bachman & LaPointe

[57] ABSTRACT

A shock absorber is provided a piston stroke dependent variable shock absorbing characteristics by means of a first and second flow restriction valves associated with a piston. The first and second flow restriction valves are arranged in a fluid path for communicating first and second working chambers defined within a shock absorber cylindrical housing in series. The first flow restriction valve is associated with an orifice forming a part of the fluid path and has variable flow restriction rate in response to a pressure difference between the first and second chambers greater. The second flow restriction means is disposed in tandem fashion with the first flow restriction valve for providing a predetermined constant flow restriction rate in response to the pressure difference smaller than a predetermined criterion and providing a variable flow restriction as a function of the piston stroke speed in response to the pressure difference greater than the predetermined criterion.

19 Claims, 10 Drawing Sheets

SHOCK ABSORBER WITH VARIABLE DAMPING CHARACTERISTICS DEPENDING UPON STROKE SPEED

BACKGROUND OF THE INVENTION

1. Field of the Invention

The present invention relates generally to a hydraulic shock absorber, such as for automotive suspension system. More specifically, the invention relates to a valve construction to be employed in the hydraulic shock absorber for achieving piston stroke speed dependent variable damping characteristics.

2. Description of the Background Art

It should be appreciated that in automotive suspension system a shock absorber is required to successfully absorb vibration energy which causes vibration in the vehicle body in order to provide for riding comfort of the vehicle. On the other hand, the shock absorber has to damp vibration for suppressing relative displacement between the vehicle body and a suspension member so as to suppress attitude change for driving stability.

It should also be appreciated that vibration energy generated in a road wheel due to unevenness generally influences the riding comfort of the vehicle and has relatively small magnitude and high frequency to cause small magnitude and high speed piston stroke in the shock absorber. On the other hand, vibration energy induced in the vehicle body generally influences the driving stability for causing attitude change, such as pitching, rolling and so forth, and has relatively great magnitude and low frequency to cause great magnitude and low speed piston stroke.

In order to provide both of the riding comfort and driving stability, it is therefore required to absorb high frequency vibration and to damp low frequency vibration. In the prior art, there have been proposed various shock absorbers which attempted to provide piston stroke dependent damping characteristics for accomplishing both of the aforementioned tasks.

For example, Japanese Utility Model First (unexamined) Publication (Jikkai) Showa 61-47134 discloses a shock absorber with a multi-stage valve assembly employed in a shock absorber piston. In the shown construction of the valve assembly, first stage and second stage disc valves are arranged in series or in tandem fashion with respect to a fluid path for fluid communication between upper and lower working chambers defined in a shock absorber cylinder. The first stage valve is designed to respond to the lower pressure to be exerted thereonto to open for fluid communication therethrough. On the other hand, the second stage valve is designed to respond to the higher pressure than the first stage valve to open for fluid communication therethrough. The second stage valve also defines a constant orifice or orifices having a predetermined fixed fluid path area for constantly permitting fluid flow therethrough in a limited flow rate.

With the construction set forth above, in a response to the low speed piston stroke which creates a smaller pressure difference between the upper and lower working chamber and thus small pressure to exert on the first stage and second stage valves. The first stage valve is responsive to this small pressure to establish fluid communication between the upper and lower fluid chambers. Therefore, the working fluid flows through the gap formed in the first stage valve and the constant orifice. In such case, since the path area is limited to be small, substantially great flow restriction for the working fluid is provided to generate great damping force to damp the vibration induced in the vehicle body. On the other hand, in response to high frequency piston stroke which creates greater pressure difference between the upper and lower working chambers, both first stage and second stage valves are open to provide increased fluid path area to produce smaller damping force. Therefore, the vibration energy input from the road wheel can be absorbed to avoid a rough ride.

In such a valve construction, the first stage valve is driven to deform at substantially higher frequency than that of the second stage valve. Therefore, the first stage valve may have shorter life in comparison with that of the second stage valve. Particularly, when the first stage valve has constant resilient characteristics, it may be subject substantially high stress to further shorten the life.

On the other hand, at a pressure difference greater than the pressure relief point of the second stage valve, the damping characteristics at a flow restriction orifice extending through the shock absorber piston varies at a rate proportional to two power of the piston stroke speed. On the other hand, at the same time, the damping characteristics at the first and second stage valves varies at a rate proportional to two over three power of the piston stroke speed. As a result, variation characteristics of overall damping characteristics of the shock absorber cannot be linear to cause difficulty of setting desired variation characteristics.

SUMMARY OF THE INVENTION

Therefore, it is an object of the present invention to provide a hydraulic shock absorber which has a linear damping characteristics in relation to a piston stroke.

Another object of the invention is to provide a hydraulic shock absorber which can avoid fatigue of valve member for generating damping force and thus expand the life of the shock absorber.

In order to accomplish the aforementioned and other objects, a shock absorber, according to the present invention, has piston stroke dependent variable shock absorbing characteristics by means of first and second flow restriction valves associated with a piston. The first and second flow restriction valves are arranged in a fluid path for communicating first and second working chambers defined within a shock absorber cylindrical housing in series. The first flow restriction valve is associated with an orifice forming a part of the fluid path and has variable flow restriction rate in response to a pressure difference between the first and second chambers. The second flow restriction means is disposed in tandem fashion with the first flow restriction valve for providing a predetermined constant flow restriction rate in response to the pressure difference smaller than a predetermined criterion and providing a variable flow restriction as a function of the piston stroke speed in response to the pressure difference greater than the predetermined criterion.

According to one aspect of the invention, a flow restriction valve unit in a hydraulic shock absorber, which valve unit is provided in one of a piston assembly or a bottom valve assembly and associated with a fluid path for communication between first and second fluid chambers, comprises:

a flow restricting orifice forming a part of the fluid path for permitting fluid flow therethrough at a first limited flow rate;

a first upstream valve associated with the flow restricting orifice and normally closing one end of the orifice for blocking fluid communication between the first and second fluid chambers, and being responsive to fluid pressure difference between the first and second fluid chamber of greater magnitude than a predetermined first magnitude to open the one end of the orifice to establish fluid communication between the first and second fluid path for permitting fluid flow from the first fluid chamber to the second fluid flow chamber; and a second downstream valve associated with the first upstream valve and arranged downstream of the first upstream valve in series with the latter with respect to the fluid flow from the first fluid chamber to the second fluid chamber, the second downstream valve having a predetermined constant flow path area of flow restriction path for communication between the downstream of the first upstream valve and the second fluid chamber, and being responsive to the fluid pressure difference between the downstream of the first upstream valve and the second fluid chamber to be greater than a second predetermined magnitude to increase the fluid path area, the first upstream and second downstream valves being so cooperated to provide linear variation of damping force in accordance with variation speed of fluid pressure difference.

According to another aspect of the invention, a hydraulic shock absorber disposed between relatively movable first and second objects for absorbing vibration energy which causes relative movement between the first and second objects, comprising:

a cylinder tube defining an internal space and connected to the first object for movement therewith;

a piston assembly disposed within the internal space of the cylinder tube for defining first and second fluid chambers therein, the piston being connected to the second objects by means of a piston rod for movement therewith;

a flow restriction valve unit provided in the piston assembly associated with a fluid path for communication between first and second fluid chambers, the valve unit comprising:

a flow restricting orifice forming a part of the fluid path for permitting fluid flow therethrough at a first limited flow rate;

a first upstream valve associated with the flow restricting orifice and normally closing one end of the orifice for blocking fluid communication between the first and second fluid chambers, and being responsive to fluid pressure difference between the first and second fluid chamber of greater magnitude than a predetermined first magnitude to open the one end of the orifice to establish fluid communication between the first and second fluid path for permitting fluid flow from the first fluid chamber to the second fluid flow chamber; and a second downstream valve associated with the first upstream valve and arranged downstream of the first upstream valve in series with the latter with respect to the fluid flow from the first fluid chamber to the second fluid chamber, the second downstream valve having a predetermined constant flow path area of flow restriction path for communication between the downstream of the first upstream valve and the second fluid chamber, and being responsive to the fluid pressure difference between the downstream of the first upstream valve and the second fluid chamber to be greater than a second predetermined magnitude to increase the fluid path area, the first upstream and second downstream valves being so cooperated to provide linear variation of damping force in accordance with variation speed of fluid pressure difference.

Preferably, the first upstream valve has a valve member capable of shifting in accordance with increasing the fluid pressure in the first fluid chamber, the valve member, being cooperated with a stopper means which limits the shifting range of the valve member. The valve member may comprise a resiliently deformable disc, and the stopper means comprises a disc shaped member having substantially the same diameter to that of the valve member so that at least the circumferential edge portion of the valve member seats thereon at a predetermined magnitude of resilient deformation, which stopper means defines a clearance to permit fluid flow from the first upstream valve to the second downstream valve through the clearance. The disc shaped member may comprise a first smaller diameter disc and a second larger diameter disc which has essentially the same diameter to the valve member, the second disc being oriented to limit deformation magnitude by contacting with the circumferential edge of the valve member and the first disc being oriented to limit deformation at the intermediate portion of the valve member. Alternatively, the disc shaped member is a resiliently deformable. In the further alternative embodiment, the disc shaped member may comprise a plurality of resiliently deformable discs laminated to each other.

The hydraulic shock absorber may further comprise a plate like member disposed between the first upstream valve and the discharge outlet of the orifice for receiving working fluid flow and distributing the uniform fluid pressure to the first upstream valve. In the alternative embodiment, the pressure difference between the first and second fluid chamber is created by stroke of the piston assembly.

In the preferred constriction, the orifice provides damping characteristics which vary at a rate proportional to two power of the stroke speed of the piston assembly; the first upstream valve provides damping characteristics which vary at a rate proportional to two over three power of the stroke speed of the piston assembly; and the second downstream valve provides damping characteristics in response to the stroke speed of the piston assembly lower than or equal to a predetermined piston speed criterion, varying at a rate proportional to two power of the stroke speed of the piston assembly, and in response to the stroke speed of the piston assembly higher than the piston stroke criterion, varying at a rate proportional to two over three power of the stroke speed of the piston assembly.

BRIEF DESCRIPTION OF THE DRAWINGS

The present invention will be understood more fully from the detailed description given herebelow and from the accompanying drawings of the preferred embodiments of the present invention, which, however, should not be taken to limit the invention to the specific embodiment or embodiments, but are for explanation and understanding only.

In the drawings.

DESCRIPTION OF THE PREFERRED EMBODIMENT

Figures 1, 2:
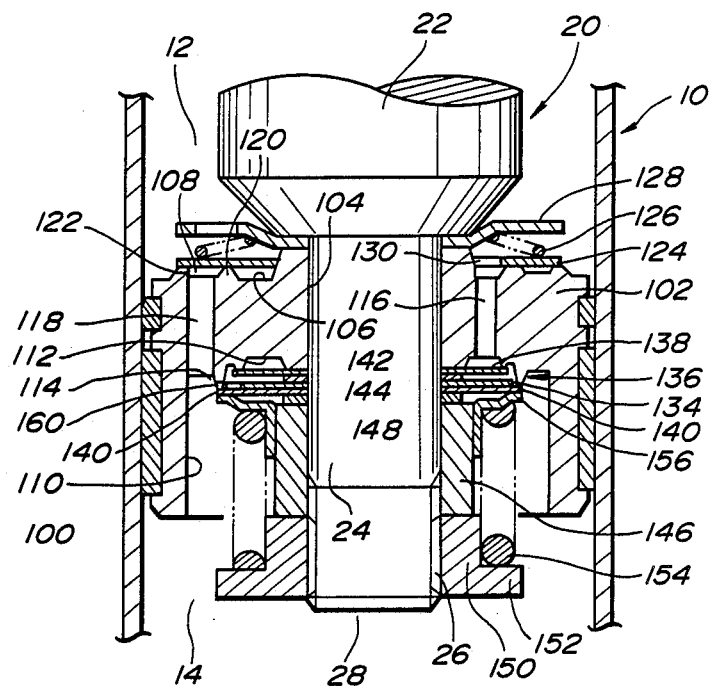
FIG. 1 is a section of a major part including a piston assembly of the first embodiment of a hydraulic shock absorber according to the present invention.
FIG. 2 is an enlarged section of a flow restricting valve unit employed in the first embodiment of the hydraulic shock absorber according to the invention.

Referring now to the drawings, particularly to FIG. 1, the first embodiment of a hydraulic shock absorber, according to the present invention, employs a piston assembly 100 disposed within a cylinder tube 10 which forms a shock absorber housing filled with a hydraulic working fluid. The piston assembly 100 is disposed within the internal space of the cylinder tube 10 in order to divide the internal space into an upper and a lower fluid chamber 12 and 14. The piston assembly 100 is mounted at the lower end of a piston rod 20 which has an upper end extending through the upper end of the cylinder tube 10. In the practical use, the shock absorber is disposed between upper and lower objects which are movable relative to each other, so as to absorb vibration energy for causing relative movement of the upper and lower objects. Though the discussion herein is given in terms of vertical installation of the shock absorber, it does not specify the direction of installation of the shock absorber. Namely, the shock absorber can be installed horizontally so as to absorb vibration energy between horizontally arranged two objects.

When the shock absorber is vertically installed as hereinbelow discussed, the piston rod 20 is connected to the upper object for moving the piston assembly 100, and the lower end of the cylinder tube 10 is connected to the lower object. In case that the shock absorber is employed in an automotive suspension system, the piston rod 20 is connected to a vehicle body at the top end and the cylinder tube 10 is connected to a suspension member which rotatably supports a road wheel. Though the vertical position of the shock absorber hereinafter discussed places the piston rod extending upwardly, it is possible to alternate the position to extend the piston rod downwardly.

As seen from FIG. 1, the piston rod 20 has a greater diameter major section 22 and a smaller diameter lower end section 24. The lower end section 24 has a threaded lower end 26. The lower end section 24 with the threaded lower end 26 forms a piston assembly receptacle 28.

The piston assembly 100 has a piston body 102 as principle component of the piston assembly. The piston body 102 has a center hole 104, through which the lower end section 24 of the piston rod 20 extends. The piston body 102 has an upper surface facing the upper working chamber 12 and a lower surface facing the lower working chamber 14. Coaxially arranged inner and outer annular grooves 106 and 108 are formed on the upper surface of the piston body 102. On the other hand, a circular groove 110 is formed on the lower surface of the piston body 102. Coaxially arranged inner and outer annular grooves 112 and 114 are formed on the surface facing groove 110. The inner annular grooves 106 and 112 are vertically aligned to each other. One or more fluid flow orifices 116 are formed through the piston body in parallel to the axis of the piston rod 20 for communication between the inner grooves 106 and 112. Similarly, the outer grooves 108 and 114 are arranged in vertical alignment and communicated with one or more communication paths 118.

Along the inner and outer grooves 106 and 108 on the upper surface of the piston body 102, annular lands 120 and 122 are formed. The lands 120 and 122 have upper planar surfaces which serve as valve seats for seating an annular disc shaped check valve member 124. The check valve member 124 is biased toward the valve seat surfaces of the lands 120 and 122 by means of a coil form check spring 126 which is disposed between the check valve member 124 and a retainer disk 128. With this construction, the check valve member 124 closes the annular grooves 106 and 108. A plurality of through openings 130 are formed in circumferential alignment at an orientation corresponding to the radial position of the inner groove 106. Therefore, the inner groove 106 is normally in communication with the upper working chamber 12 via these through openings 130. On the other hand, the check valve member 124 has solid construction in the orientation corresponding to the outer annular groove 108. Therefore, the check valve member 124 normally blocks fluid communication and response to the fluid pressure in the lower working chamber 14 higher than that in the upper working chamber in a magnitude greater than a predetermined relief pressure overcoming the spring force of the check spring 126 to be shifted upwardly to establish fluid communication between the lower and upper working chambers 14 and 12. On the other hand, the check valve member 124 constantly blocks fluid flow from the upper working chamber 12 to the lower working chamber 14.

Lands 132 and 134 are formed along the circumferential edges of the inner and outer annular grooves 112 and 114. The lands 132 and 134 have lower end planar surfaces. A piston stroke speed dependent variable damping characteristics valve unit 136 is provided in opposition to the lower surfaces of the lands 132 and 134.

As shown in FIGS. 1 and 2, the valve unit 136 comprises an upper disc valve member 138 and a lower disc valve member 140. An annular washer 142 and a stopper plate 144 are disposed between the upper and lower disc valve members 138 and 140. These upper and lower disc valve members 138 and 140, the washer 142 and the stopper plate 144 forms the flow restriction valve unit 136 and are supported by an annular cylindrical collar 146 via disc shaped washer 148 on a retainer nut 150 which engages with the threaded lower end 26 of the piston rod 20.

The retainer nut 150 has a laterally extending flange 152, on which a lower end of an assist coil spring 154 is seated. The upper end of the assist coil spring 154 is seated on a spring seat member 156. The spring force of the assist spring 154 is thus exerted on the outer circumferential edge portion of the lower disc valve member 140 via the spring seat member 156 so that the outer circumferential edge of the lower disc valve member 140 is normally urged toward the lower planer surface of the outer annular land 134.

The upper and lower disc valve members 138 and 140 are formed of resiliently deformable material and provided spring characteristics for self-biasing the respective circumferential edge portions toward the opposing planer lower surfaces of the lands 134 and 132. The upper disc valve member 138 thus normally seats the outer circumferential edge portion on to the lower planar surface of the land 134 for closing the inner annular groove 112. Therefore, when the working fluid pressure in the upper working chamber 12 which is introduced into the inner annular groove 112 via the orifices 116 is not greater than the working fluid in the lower working chamber 14 in a magnitude greater than a predetermined pressure which is set pressure of the upper disc valve member 138 by the resiliency thereof, the inner annular groove 112 is held closed. Therefore, the fluid communication between the upper and lower working chambers 12 and 14 via the orifices 116 is blocked. The upper disc valve member 138 is overcome by the working fluid pressure in the upper working fluid chamber 12 greater than that in the lower working chamber 14 in a magnitude greater than the set pressure to form a gap between the lower end planer surface of the land 134 to permit fluid flow therethrough. The stopper plate 144 is formed with one or more cut outs 158 on the outer circumference. On the other hand, the outer annular land 136 is formed with one or more cut outs 160 which cooperate with the lower disc valve member 140 as seated on the seating surface of the land 136 to form a constant path area orifice for fluid communication. Therefore, when the gap is formed between the upper disc valve member 138 and the mating surface of the land 134, the working fluid flows through the cut outs 158 of the stopper plate 144 and the cut outs 160 of the lands 136. At this time, since the fluid flow path area at the gap between the upper disc valve member 138 and the land 134 is limited to restrict fluid flow, the gap serves as first stage orifice for generating damping force. On the other hand, the constant fluid flow path area orifices defined by the cut out 160 of the land 136 provides another flow restriction for the fluid flowing from the upper working chamber 12 to the lower working fluid chamber and thus serves as a second stage flow restriction orifice.

It should be noted that the resilience of the lower disc valve member 140 is cooperative with the spring force of the assist spring 154 to determine the set pressure of the lower disc valve member 140. The set pressure of the lower disc valve member 140 is determined to be greater than that of the upper disc valve member 138. In addition, as clearly seen from FIG. 2, the effective area of the first disc valve member 138, on which the working fluid pressure in the annular groove 112 is exerted, is set to be much greater than the effective area of the second disc valve member 140. Therefore, the upper disc valve member 138 is provided higher sensitivity of the working fluid pressure in the upper working chamber 12 greater than that in the lower working chamber 14, than the lower disc valve member 140.

Figure 3:
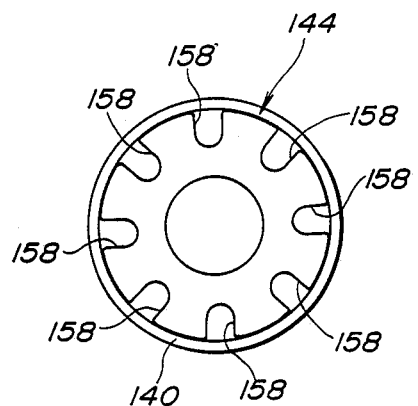
FIGS. 3 to 6 show examples of stopper plates to be employed in the first embodiment of the hydraulic shock absorber of FIG. 1.

As shown in FIGS. 2 and 3, the stopper plate 144 is formed of a rigid material and provided slightly smaller diameter than the inner diameter of the lower end of the annular land 136 to define a clearance therebetween. On the other hand, the cut outs 158 are formed into essentially U-shaped configuration and arranged along the outer circumference with a regular angular intervals.

In the practical operation, damping force for absorbing vibration energy in the piston stroke toward the lower working chamber with compressing the working fluid in the lower working chamber, is generated by flow restriction in the openings 118 which provide limited fluid flow path area and a spring force of the check spring 126.

On the other hand, in the piston stroke toward the upper working chamber 12 to cause compression of the working fluid in the upper working chamber, the valve unit 136 operates in two mutually different modes depending upon the piston stroke speed.

When the piston strokes at relatively low speed, variation rate of the working fluid pressure in the upper and lower fluid chambers 12 and 14 is held at relatively low rate. Therefore, speed of variation of pressure difference between the upper and lower working chamber 12 and 14 is maintained low. As a result, the working fluid force acting on the valve unit due to difference of the working fluid pressure in the upper and lower working chambers 12 and 14 increases at relatively low speed. When the fluid force is grown to be greater than the set pressure of the upper disc valve member 138, the upper disc valve member 138 is deformed to shift the circumferential edge portion away from the seating surface of the land 134 to form a gap therebetween to permit fluid flow therethrough. On the other hand, at this time, the working fluid pressure acting on the lower disc valve member 140 is maintained smaller than the set pressure thereof. Therefore, the working fluid flowing through the gap formed by deformation of the upper disc valve member 138 flows through the constant flow area orifices 160 formed through the land 136.

At this time, the damping characteristics at the first stage orifice formed by the deformation of the upper disc valve member 138, varies at a rate proportional to two over three power of the piston stroke speed. On the other hand, the sampling characteristics at the second stage orifice defined by the constant fluid path area orifices 160 varies at a rate proportional to two power of the piston stroke speed. Therefore, the damping force to be created in response to relatively low piston stroke speed becomes relatively greater.

On the other hand, when the piston strokes at relatively high speed, the pressure difference produced in the working fluid in the upper and lower working chambers 12 and 14 varies at greater rate than that in the low piston stroke speed set forth above. When the piston stroke speed is higher than a certain speed, the working fluid pressure exerted on the lower disc valve 140 becomes greater than the set pressure of the lower disc valve member 140 to overcome the combined spring force of the valve member and the assist spring 154. Therefore, the lower disc valve member 140 is deformed to shift the circumferential edge portion away from the seating surface of the land 136 to form a gap therebetween. By this, the fluid flow area defined by the second stage orifice becomes greater than that in the low speed piston stroke.

At this time, the damping characteristics at the second stage orifice varies at a rate proportional to two over three of the piston stroke speed. Therefore, the flow restriction for the working fluid at the second stage orifice becomes smaller to provide smaller damping force in comparison with that in the low piston stroke speed mode.

It should be appreciated that the stopper plate 144 is made of rigid material so as not to cause the deformation in response to the fluid pressure acting thereon. As seen from FIG. 2, the stopper plate 144 is placed away from the upper disc valve member leaving clearance defined by the height of the washer 142. This construction limits deformation range of the upper disc valve member 138 to prevent the latter from causing excessive deformation. This assures expansion of the life of the upper disc valve member and thus expands durability of the shock absorber.

Figure 4:
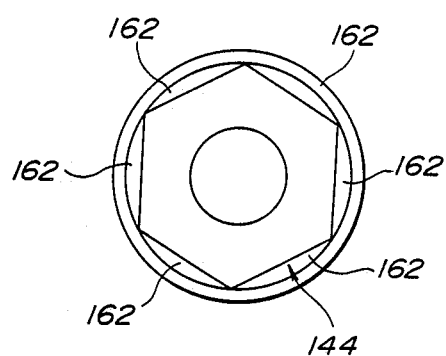
Figure 5:
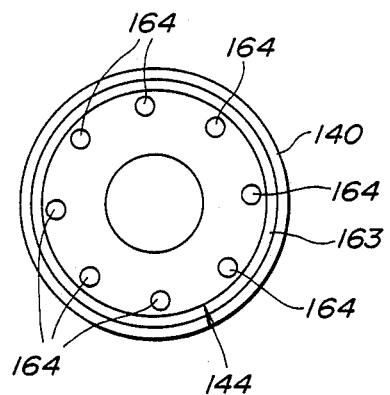
Figure 6:
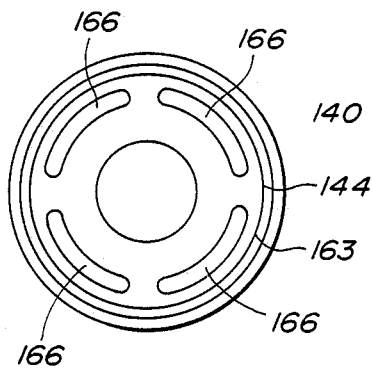

FIGS. 4 to 6 illustration of the modifications of configuration of the stopper member to be employed in the foregoing first embodiment. In FIG. 4, the stopper plate 144 is formed into an hexagonal configuration to form clearance 162 between the inner circumferential edge of the land 136 and the straight portion between the adjacent peaks. On the other hand, In FIG. 5, the stopper plate 144 is formed into a circular disc shaped configuration. The diameter of the circular disc shaped stopper plate 144 is set to be slightly smaller than the inner diameter of the inner circumferential edge of the land 136 in order to define an annular clearance 163. A plurality of circular through openings 164 are formed in the vicinity of the circumferential edge. The pressurized fluid flowing through these openings 164 acts on the corresponding portion of the lower disc valve member 140 so as to prevent the second disc valve member from sticking on the stopper plate. In FIG. 6, the stopper plate 144 is formed with a plurality of elongated arc shaped openings 166. The construction shown in FIG. 6 performs substantially the same effect to that performed by the construction of FIG. 5.

Figure 7:
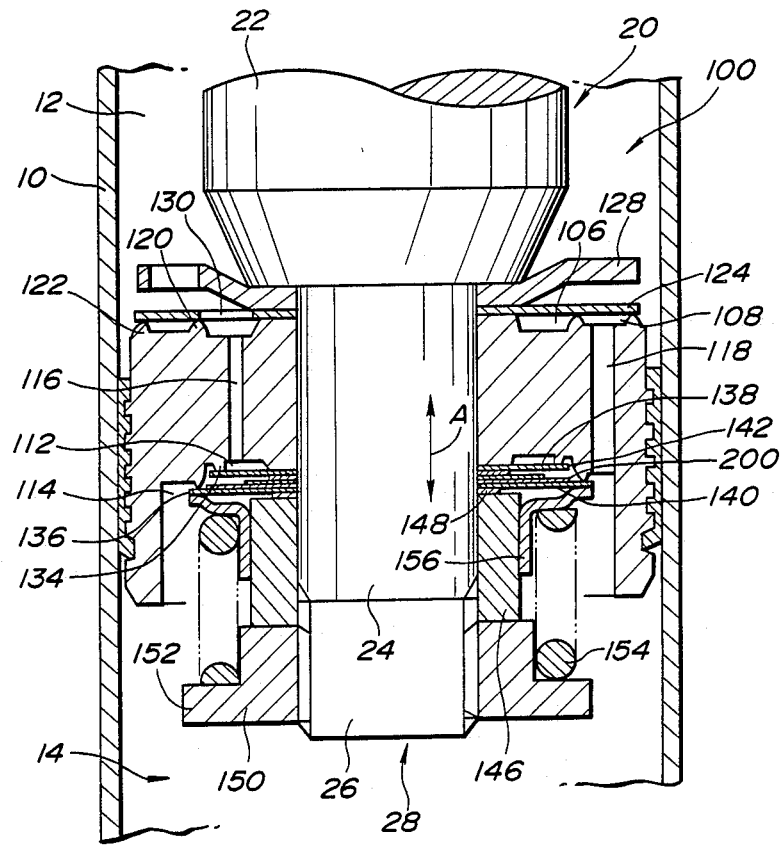
FIG. 7 is a section of a piston assembly in the second embodiment of a hydraulic shock absorber according to the present invention.

FIG. 7 shows the second construction of the hydraulic shock absorber according to the invention. In the discussion given herebelow, the common components to the former embodiment will be represented by the same reference numerals to the former embodiment and neglect the detailed discussions therefor.

In the shown embodiment, the construction of the piston assembly 100 is almost same as that of the former embodiment except for a stopper plate 200 which is modified from the stopper plate 144 in the first embodiment. Namely, in the shown embodiment, the stopper plate 200 comprises a pair of thinner plates 202 and 204. The plates 202 and 204 are formed in disc shaped configurations. The external diameter of the plate 204 is substantially equal to the diameter of the upper disc valve member 138. The plate 202 is provided smaller diameter than that of the plate 204. The plate 202 is placed on the plate 204.

Figure 8:
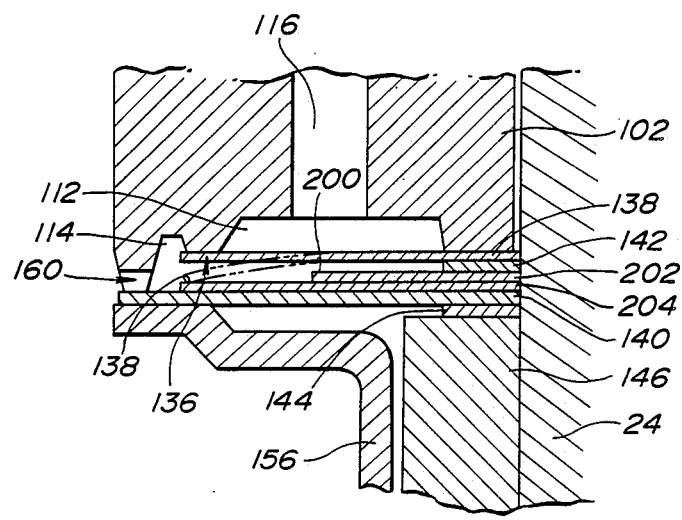
FIGS. 8 and 9 are enlarged sections of valve units employed in the second embodiment of the hydraulic shock absorber in different mode positions.
Figure 9:
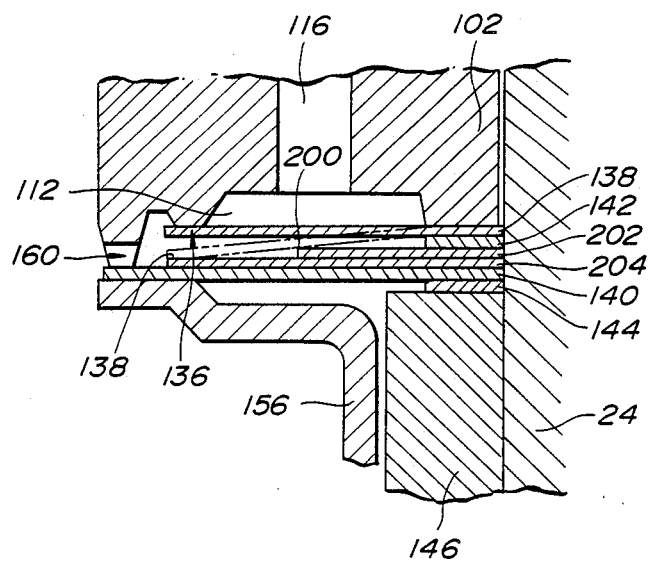

In the construction set forth above, the valve unit 136 operates for producing damping force in response to the piston stroke toward the upper working chamber 12 in a manner substantially as illustrated with respect to the foregoing first embodiment of the invention. In the second embodiment of FIG. 7, when the piston stroke speed is relatively low, the magnitude of deformation of the upper disc valve member 138 is relatively small. In such case, the circumferential edge portion of the upper disc valve member 138 comes into contact with the plate 204 to be restricted from further deformation as shown by phantom line in FIG. 8. On the other hand, when the piston stroke speed is relatively high, whole body deformation is caused in the upper disc valve member 138 to cause deformation at the intermediate portion of the upper disc valve member. This causes expansion of the first stage orifice for permitting greater amount of working fluid. By the whole body deformation, the intermediate portion of the upper disc valve member 138 comes into contact with the plate 202 to be restricted from further deformation.

Such construction of valve unit may provide variable damping characteristics even in the low piston stroke speed mode of operation. Furthermore, limitation for deformation magnitude of the upper disc valve member 138 will successfully prevent the upper disc valve member from causing excessive deformation which may cause shortening of life of the upper disc valve member.

Figure 10:
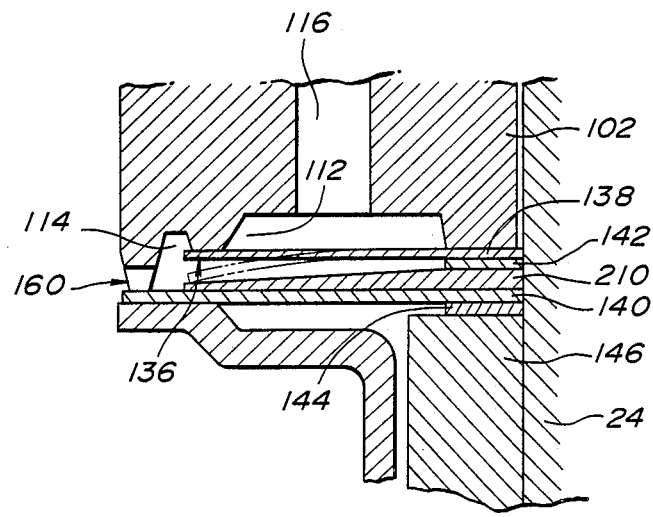
FIG. 10 is an enlarged section of a modification of valve unit to be employed in the second embodiment of the hydraulic shock absorber of FIG. 7.

FIG. 10 shows modification of the aforementioned second embodiment of the valve unit to be employed in the second embodiment of the hydraulic shock absorber according to the invention. In this embodiment, the stopper plate 200 is replaced with a plate like member 210 with a slanted upper surface. As seen from FIG. 10, the plate line member 210 is formed in a disc shaped configuration and having the thinner circumferential edge and increases thickness toward the inside. With this construction, the deformation stroke of the upper disc valve member 138 is gradually and linearly increased toward the outer circumferential edge. With the shown construction, substantially the same effect for limiting deformation magnitude as that achieved by the embodiment of FIG. 7 can be achieved.

Figure 11:
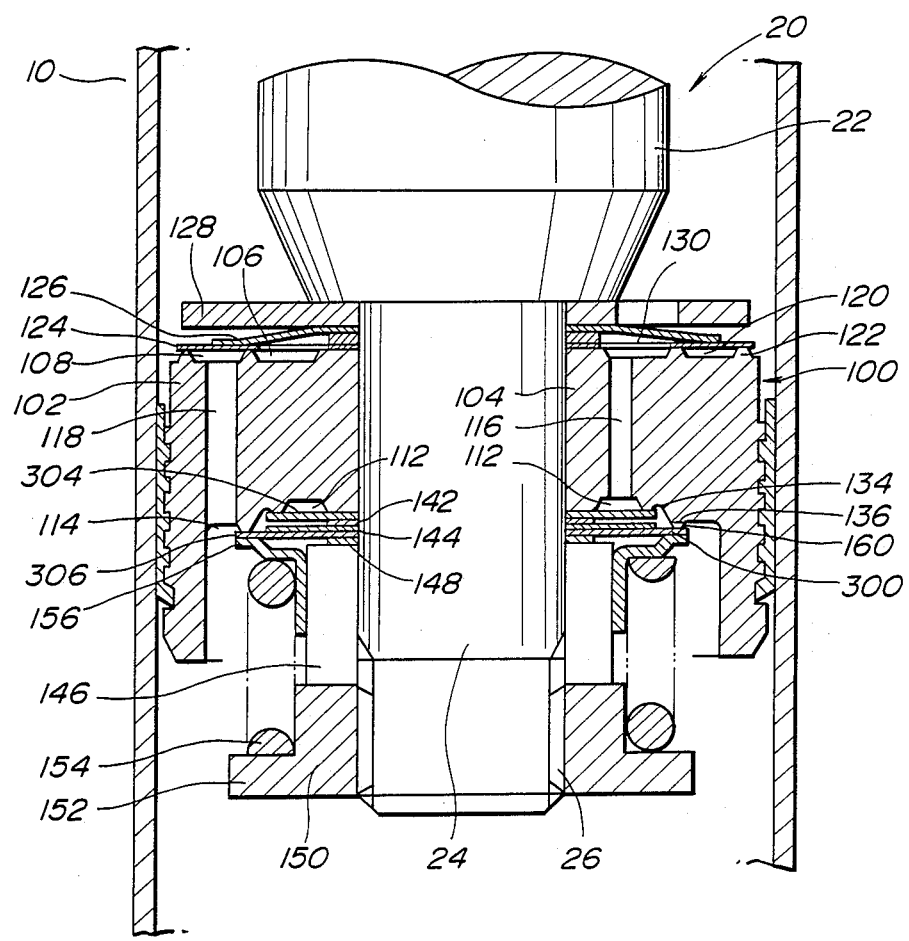
FIG. 11 is a section of a piston assembly in the third embodiment of a hydraulic shock absorber according to the present invention.

FIG. 11 shows the third embodiment of the hydraulic shock absorber according to the invention. Similarly to the former embodiment of FIG. 7, the shown embodiment has substantially the same structural components to that illustrated with respect to the first embodiment of FIG. 1. In order to avoid redundant discussion, common components between the shown embodiment and the first embodiment will be represented by the same reference numerals.

The third embodiment of the shock absorber is differentiated from the former embodiments of FIGS. 1 and 7 in the stopper plate 300 in the valve unit 136. The stopper plate 300 employed in the shown embodiment comprises a plurality of thin resiliently deformable discs 302 as particularly shown in FIGS. 12 and 13. The thin discs 302 are laminated to each other to form integral deformable disc. Also, the upper and lower disc valve members 304 and 306 respectively comprise a plurality of thin resiliently deformable discs 308 and 310. In the shown construction, respective upper and lower disc valve members 304 and 306 and the stopper plate 300 are formed by laminated pair of thin discs 308, 310 and 302. The resilient coefficient of respective thin discs 308, 310 and 302 are differentiated from each other so as to establish desired resilient coefficient in the laminated forms.

In the preferred construction, the resilient coefficient of the upper disc valve member 304 is set to be smallest among three laminated discs. On the other hand, the resilient coefficient of the stopper plate 302 may be set to be the greatest among three laminated plates.

Figure 12:
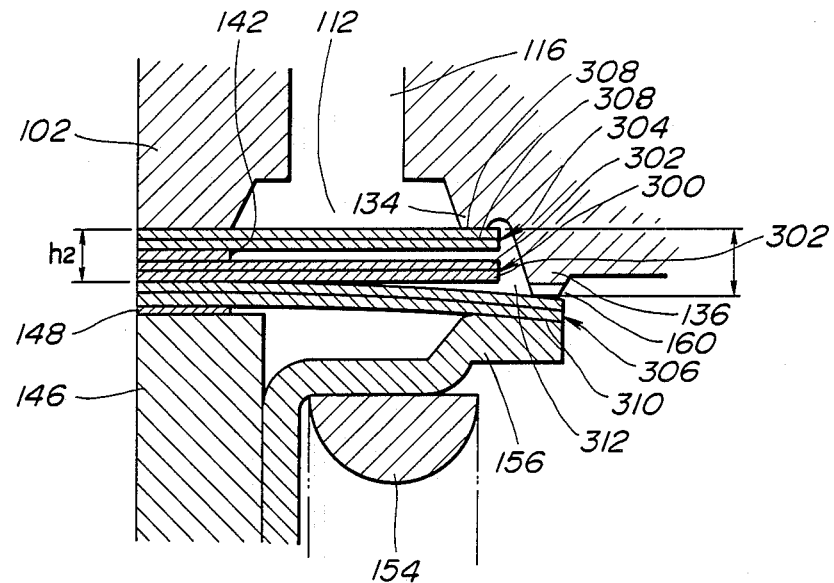
FIGS. 12 and 13 are enlarged sections of valve units employed in the third embodiment of the hydraulic shock absorber in different mode positions.
Figure 13:
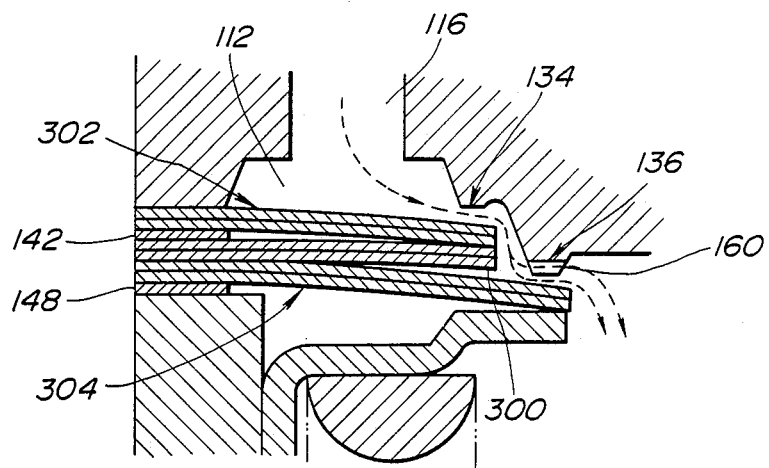

As seen from FIGS. 11 to 13, the seating surfaces of the lands 134 and 136 are oriented at vertically shifted position to have a level difference in a distance $h_1$ in the vertical direction. In relation to the distance $h_1$, the thicknesses of the thin discs 308 and 302 and height of the washer 142 are so selected as to have the overall thickness $h_2$ as assembled smaller than the distance $h_1$. Therefore, the lower disc valve member 140 which has the circumferential edge portion seating on the seating surface of the land 136, is slightly deformed at the normal position as clearly shown in FIG. 12. This forms a clearance 312 between the lower disc valve member 306 and the stopper plate 300. The clearance 312 formed between the stopper plate 300 and the lower disc valve member 306 cancels the fluid pressure exerted on the stopper plate when the upper disc valve member 304 is deformed to form the first stage orifice. Therefore, the first stage orifice may not becomes excessively great to provide desired flow restriction for generating damping force.

Similarly to the foregoing first embodiment, the valve unit 136 performs two different mode flow restrictions for generating damping force.

Figure 14:
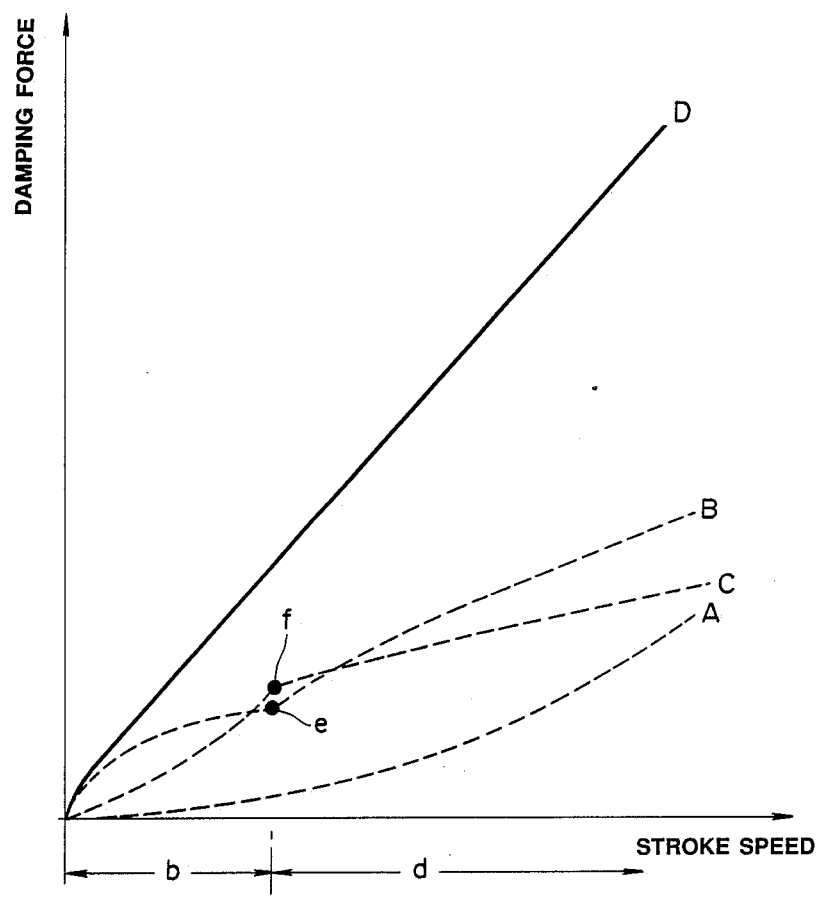
FIG. 14 is a graph shocking variation of damping force to be generated at various piston stroke speed.

When the piston strokes at relatively low speed in a piston stroke speed range as illustrated by the range b in FIG. 14, variation rate of the working fluid pressure in the upper and lower fluid chambers 12 and 14 is held at relatively low rate. Therefore, speed of variation of pressure difference between the upper and lower working chamber 12 and 14 is maintained low. As a result, the working fluid force acting on the valve unit due to difference of the working fluid pressure in the upper and lower working chambers 12 and 14 increases at relatively low speed. When the fluid force is grown to be greater than the set pressure of the upper disc valve member 304, the upper disc valve member 300 is deformed to shift the circumferential edge portion away from the seating surface of the land 134 to form a gap therebetween to permit fluid flow therethrough. At this position, variation of the damping force produced by the orifices is proportional to two power of the piston stroke speed, as illustrated by the broken line A of FIG. 14. Also, the variation of damping force to be produced at the first stage orifice is proportional to two over three power of the piston stroke speed as illustrated by broken line B in FIG. 14. On the other hand, at this time, the working fluid pressure acting on the lower disc valve member 140 is maintained smaller than the set pressure thereof. Therefore, the working fluid flowing through the gap formed by deformation of the upper disc valve member 138 flows through the constant flow area orifices 160 formed through the land 136. The variation of the damping force to be produced at the second stage orifice is proportional to two power of the piston stroke speed, as illustrated by the broken line C of FIG. 14. Since these orifices are arranged in tandem fashion or in series, overall damping force to be produce in this mode becomes almost liner as illustrated by the solid line D of FIG. 14.

In response to the piston stroke speed in a range of d of FIG. 14, the upper disc valve member 304 contacts with the stopper plate 300 to increase stiffness. Therefore, at a point e in FIG. 14, the stiffness of the upper disc valve member 304 is changed. Therefore, the variation of the damping force becomes proportional component which is proportional to two over three power of the piston stroke speed, and an initial component which is the damping force at the point e. On the other hand, at a point f of FIG. 14, the lower disc valve member 306 start deformation for forming gap between the seating surface of the land 136 and the circumferential edge portion of the lower disc valve member. After starting the deformation of the lower disc valve member 306, the variation characteristics of the damping force becomes proportional to tow over three power of the piston stroke speed. Therefore, as shown by the solid line D in FIG. 14, even at this high piston speed range, the damping force variation characteristics becomes linearly proportional to the piston stroke speed.

Figure 15:
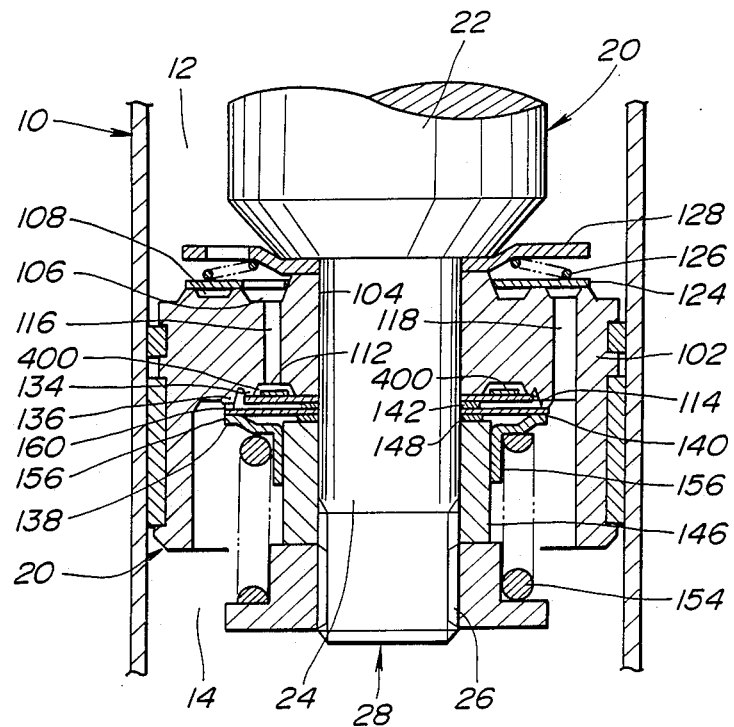
FIG. 15 is a section of a piston assembly in the fourth embodiment of a hydraulic shock absorber according to the present invention.
Figure 16:
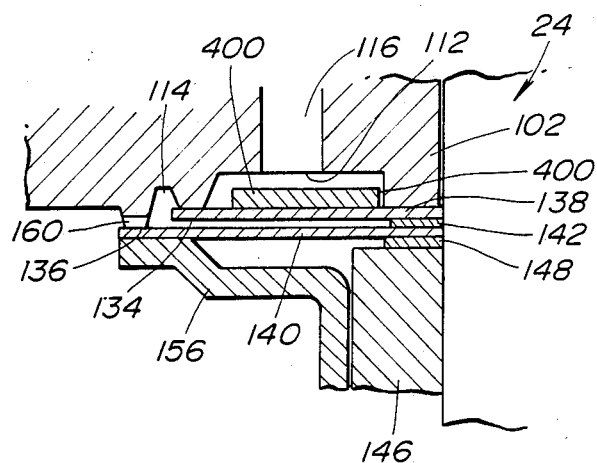
FIG. 16 is an enlarged section of a valve unit employed in the piston assembly of the fourth embodiment of the hydraulic shock absorber of FIG. 15.

FIGS. 15 and 16 show the fourth embodiment of the shock absorber according to the present invention. The shown embodiment is illustrated in a form, in which the stopper plates in the former embodiments is not provided. Though the shown embodiment does not have the stopper plate, it is of course possible to provide the stopper plate in this embodiment.

The particular point of the shown embodiment resides in an annular disc plate 400. The annular disc plate 400 is provided within the inner annular groove 112 above the upper disc valve member 138. The annular disc plate 400 has a width to receive all working fluid discharged through the orifices 116. On the other hand, the outer diameter of the annular disc plate 400 is smaller than the diameter of the external circumferential edge of the inner annular groove 112 so that the working fluid introduced into the groove can flow through the gap therebetween.

This annular disc plate 400 prevents the working fluid from directly contacting with the upper disc valve member 138 to cause concentration at the position where the orifices 116 are formed. Since the concentration of the fluid pressure at the portion of the orifices will cause uneven deformation in the upper disc valve member to cause fluctuation of damping characteristics, it is desired to be avoided.

Figure 17:
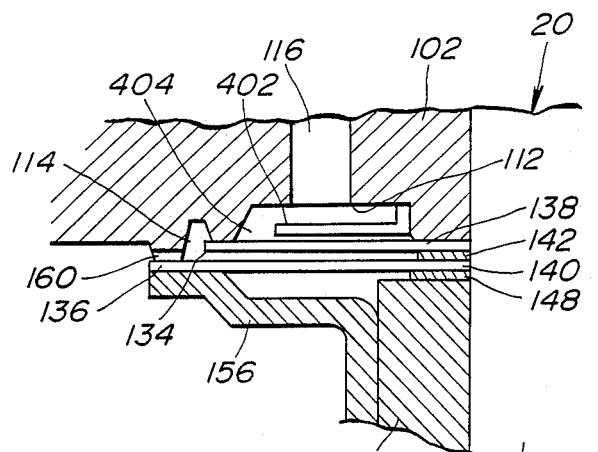
FIGS. 17 to 19 are enlarged sections showing variation of the valve unit to be employed in the fourth embodiment of the hydraulic shock absorber of FIG. 16.
Figure 18:
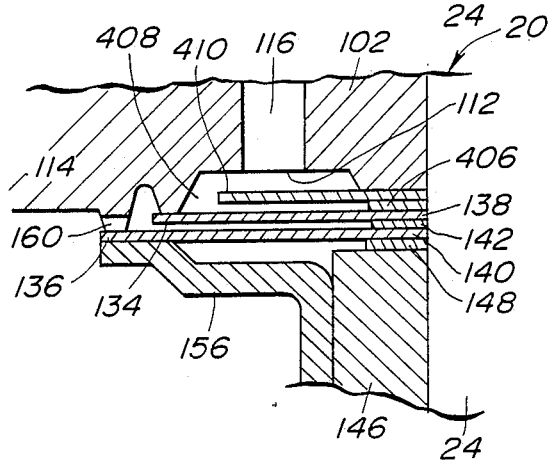
Figure 19:
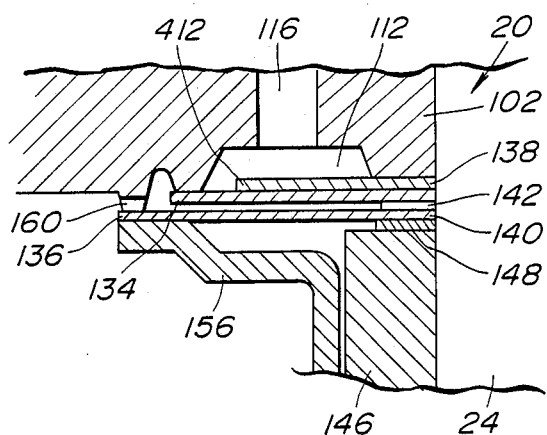

Similar effect for avoiding concentration of the fluid pressure at the particular section of the upper disc valve member 138 can be achieved by various construction of members. For example, in the construction of FIG. 17, the annular disc valve member 402 is fixed onto the inner peripheral edge of the groove 112 so that the annular disc valve member 402 is placed away from the upper disc valve member 138 to leave a clearance 404 therebetween. On the other hand, in the example of FIG. 18, a clearance 406 is provided by a washer 408 disposed between the annular disc 410 and the upper disc valve member 138. Though it is preferable to provide the annular disc in spaced apart relationship with the upper disc valve member 138, it is possible to provide the annular disc 412 together with the upper disc valve member 138 in engagement with the piston rod 24, as shown in FIG. 19.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A flow restriction valve unit in a hydraulic shock absorber, which valve unit is provided in one of a piston assembly or a bottom valve assembly and associated with a fluid path for communication between first and second fluid chambers, comprising:

a flow restricting orifice forming a part of said fluid path for permitting fluid flow therethrough at a first limited flow rate;

a first upstream valve associated with said flow restricting orifice and normally closing one end of said orifice for blocking fluid communication between said first and second fluid chambers, and being responsive to fluid pressure difference between said first and second fluid chamber greater magnitude than a predetermined first magnitude to open said one end of said orifice to establish fluid communication between said first and second fluid path for permitting fluid flow from said first fluid chamber to said second fluid flow chamber, said first upstream valve including a first resiliently deformable valve member which is normally biased in a direction for closing said one end of said orifice and deformable to increase fluid path area according to increasing fluid pressure difference between said first and second fluid chambers;

a second downstream valve associated with said first upstream valve and arranged downstream of said first upstream valve in series with the latter with respect to the fluid flow from said first fluid chamber to said second fluid chamber, said second downstream valve having a predetermined constant and minimum flow path area of flow restriction path for communication between the downstream of said first upstream valve and said second fluid chamber for providing a predetermined maximum magnitude of fluid flow restriction when the fluid pressure difference between said downstream of said first upstream valve and said second fluid chamber to be smaller than or equal to a second predetermined magnitude, and being responsive to the fluid pressure difference between said downstream of said first upstream valve and said second fluid chamber to be greater than a second predetermined magnitude to shift for increasing said fluid path area, said second downstream valves being so cooperated with said first upstream valve as to provide linear variation of damping force in accordance with variation speed of fluid pressure difference;

said second downstream valve including a second resiliently deformable valve member which is normally biased in a direction for providing the minimum path area and deformable to increase fluid path area according to increasing fluid pressure difference between the downstream of said first upstream valve and second fluid chambers; and a stopper means disposed between said first upstream and second downstream valves for defining a maximum deformation magnitude of said first valve member of said first upstream valve means.

2. A valve unit as set forth in claim 1, wherein said first upstream valve has a valve member capable of shifting in accordance with increasing of the fluid pressure in said first fluid chamber, said valve member being cooperated with a stopper means which limits shifting range of said valve member.

3. A valve unit as set forth in claim 2, wherein said valve member comprises a resiliently deformable disc, and said stopper means comprises a disc shaped member having substantially the same diameter to that of said valve member so that at least the circumferential edge portion of said valve member seats thereon at a predetermined magnitude of resilient deformation, which stopper means defines a clearance to permit fluid flow from said first upstream valve to said second downstream valve through said clearance.

4. A valve unit as set forth in claim 3, wherein said disc shaped member comprises a first smaller diameter disc and a second larger diameter disc which has essentially the same diameter to said valve member, said second disc being oriented to limit deformation magnitude by contacting with the circumferential edge of said valve member and said first disc being oriented to limit deformation at the intermediate portion of said valve member.

5. A valve unit as set forth in claim 3, wherein said disc shaped member is a resiliently deformable.

6. A valve unit as set forth in claim 3, wherein said disc shaped member comprises a plurality of resiliently deformable discs laminated to each other.

7. A valve unit as set forth in claim 1, which further comprises a plate like member disposed between said first upstream valve and the discharge outlet of said orifice for receiving working fluid flow and distributing the uniform fluid pressure to all effective area of said first upstream valve.

8. A valve unit as set forth in claim 1, wherein said pressure difference between said first and second fluid chamber is created by stroke of said piston assembly.

9. A valve unit as set forth in claim 8, wherein said orifice provides damping characteristics which vary at a rate proportional to two power of the stroke speed of said piston assembly; said first upstream valve provides damping characteristics varying at a rate proportion to two over three power of the stroke speed of said piston assembly; and said second downstream valve provides damping characteristics in response to the stroke speed of said piston assembly lower than or equal to a predetermined piston speed criterion, varying at a rate proportional to two power of the stroke speed of said piston assembly, and in response to the stroke speed of said piston assembly higher than said piston stroke criterion, varying at a rate proportional to two over three power of the stroke speed of said piston assembly.

10. A hydraulic shock absorber disposed between relatively movable first and second objects for absorbing vibration energy which causes relative movement between said first and second objects, comprising:

a cylinder tube defining an internal space and connected to said first object for movement therewith;

a piston assembly disposed within said internal space of said cylinder tube for defining first and second fluid chambers therein, said piston being connected to said second objects by means of a piston rod for movement therewith;

a flow restriction valve unit provided in said piston assembly associated with a fluid path for communication between first and second fluid chambers, said valve unit comprising:

a flow restricting orifice forming a part of said fluid path for permitting fluid flow therethrough at a first limited flow rate;

a first upstream valve associated with said flow restricting orifice and normally closing one end of said orifice for blocking fluid communication between said first and second fluid chambers, and being responsive to fluid pressure difference between said first and second fluid chamber greater magnitude than a predetermined first magnitude to open said one end of said orifice to establish fluid communication between said first and said second fluid path for permitting a fluid flow from said first fluid chamber to said second fluid flow chamber, said first upstream valve including a first resiliently deformable valve member which is normally biased in a direction for closing said one end of said orifice and deformable to increase fluid path area according to increasing fluid pressure difference between said first and second fluid chambers;

a second downstream valve associated with said first upstream valve and arranged downstream of said first upstream valve in series with the latter with respect to the fluid flow from said first fluid chamber to said second fluid chamber, said second downstream valve having a predetermined constant and minimum flow path area of flow restriction path for communication between the downstream of said first upstream valve and said second fluid chamber for providing a predetermined maximum magnitude of fluid flow restriction when the fluid pressure difference between said downstream of said first upstream valve and said second fluid chamber to be smaller than or equal to a second predetermined magnitude, and being responsive to the fluid pressure difference between said downstream of said first upstream valve and said second fluid chamber to be greater than a second predetermined magnitude to shift for increasing said fluid path area;

said second downstream valves being so cooperated with said first upstream valve as to provide linear variation of damping force in accordance with variation speed of fluid pressure difference;

said second downstream valve including a second resiliently deformable valve member which is normally biased in a direction for providing the minimum path area and deformable to increase fluid path area according to increasing fluid pressure difference between the downstream of said first upstream valve and second fluid chambers; and a stopper means disposed between said first upstream and second downstream valves for defining a maximum deformation magnitude of said first valve member of said first upstream valve means.

11. A hydraulic shock absorber as set forth in claim 10, wherein said first upstream valve has a valve member capable of shifting in accordance with increasing of the fluid pressure in said first fluid chamber, said valve member being cooperated with a stopper means which limits shifting range of said valve member.

12. A hydraulic shock absorber as set forth in claim 11, wherein said valve member comprises a resiliently deformable disc, and said stopper means comprises a disc shaped member having substantially the same diameter to that of said valve member so that at least the circumferential edge portion of said valve member seats thereon at a predetermined magnitude of resilient deformation, which stopper means defines a clearance to permit fluid flow from said first upstream valve to said second downstream valve through said clearance.

13. A hydraulic shock absorber as set forth in claim 12, wherein said disc shaped member comprises a first smaller diameter disc and a second larger diameter disc which has essentially the same diameter to said valve member, said second disc being oriented to limit deformation magnitude by contacting with the circumferential edge of said valve member and said first disc being oriented to limit deformation at the intermediate portion of said valve member.

14. A hydraulic shock absorber as set forth in claim 12, wherein said disc shaped member is a resiliently deformable.

15. A hydraulic shock absorber as set forth in claim 12, wherein said disc shaped member comprises a plurality of resiliently deformable discs laminated to each other.

16. A hydraulic shock absorber as set forth in claim 10, which further comprises a plate like member disposed between said first upstream valve and the discharge outlet of said orifice for receiving working fluid flow and distributing the uniform fluid pressure to all effective area of said first upstream valve.

17. A hydraulic shock absorber as set forth in claim 10, wherein said pressure difference between said first and second fluid chamber is created by stroke of said piston assembly.

18. A hydraulic shock absorber as set forth in claim 17, wherein said orifice provides damping characteristics which vary at a rate proportional to two power of the stroke speed of said piston assembly; said first upstream valve provides damping characteristics varying at a rate proportional to two over three power of the stroke speed of said piston assembly; and said second downstream valve provides damping characteristics in response to the stroke speed of said piston assembly lower than or equal to a predetermined piston speed criterion, varying at a rate proportional to two power of the stroke speed of said piston assembly, and in response to the stroke speed of said piston assembly higher than said piston stroke criterion, varying at a rate proportional to two over three power of the stroke speed of said piston assembly.

19. A flow restriction valve unit in a hydraulic shock absorber, which valve unit is provided in one of a piston assembly or a bottom valve assembly and associated with a fluid path for communication between first and second fluid chambers, comprising:

a flow restriction orifice forming a part of said fluid path for permitting fluid flow therethrough at a first limited flow rate;

a first upstream valve associated with said flow restriction orifice and normally closing one end of said orifice for blocking fluid communication between said first and second fluid chambers, and being responsive to fluid pressure difference between said first and second fluid chamber greater magnitude than a predetermined first magnitude to open said one end of said orifice to establish fluid communication between said first and second fluid path for permitting fluid flow from said first fluid chamber to said second fluid flow chamber, said first upstream valve including a first resiliently deformable valve member which is normally biased in a direction for closing said one end of said orifice and deformable to increase fluid path area according to increasing fluid pressure difference between said first and second fluid chambers;

a second upstream valve associated with said first upstream valve and arranged downstream of said first upstream valve in series with the latter with respect to the fluid flow from said first fluid chamber to said second fluid chamber, said second downstream valve having a predetermined constant and minimum fluid path area of flow restriction path for communication between the downstream of said first upstream valve and said second fluid chamber for providing a predetermined maximum magnitude of fluid flow restriction when the fluid pressure difference between said downstream of said first upstream valve and said second fluid chamber to be smaller than or equal to a second predetermined magnitude to increase said fluid path, and being responsive to the fluid pressure difference between said downstream of said first upstream valve and said second fluid chamber to be greater than a second predetermined magnitude to shift for increasing said fluid path area, said second downstream valve being so cooperated with said first upstream valve as to provide linear variation of damping force in accordance with variation speed of fluid pressure difference, said second downstream valve including a second resiliently deformable valve member which is normally biased in a direction for providing the minimum path area and deformable to increase fluid path area according to increasing fluid pressure difference between the downstream of said first upstream valve and second fluid chambers; and means provided at an orientation upstream of said first valve member for preventing the fluid flowing through said flow restriction orifice from said first fluid chamber to said second fluid chamber from directly contacting with said first valve member so as to avoid local concentration of the fluid force.

* * * * *